United States Patent
Bernhardsgrütter et al.

(10) Patent No.: US 12,449,291 B2
(45) Date of Patent: Oct. 21, 2025

(54) THERMAL SENSOR AND METHOD FOR OPERATING THE THERMAL SENSOR

(71) Applicant: Innovative Sensor Technology IST AG, Ebnat-Kappel (CH)

(72) Inventors: Ralf Emanuel Bernhardsgrütter, Sulgen (CH); Christoph Hepp, Wil (CH)

(73) Assignee: Innovator Sensor Technology IST AG, Ebnat-Kappel (CH)

( * ) Notice: Subject to any disclaimer, the term of this patent is extended or adjusted under 35 U.S.C. 154(b) by 276 days.

(21) Appl. No.: 18/550,780

(22) PCT Filed: Feb. 21, 2022

(86) PCT No.: PCT/EP2022/054256
§ 371 (c)(1),
(2) Date: Sep. 15, 2023

(87) PCT Pub. No.: WO2022/199960
PCT Pub. Date: Sep. 29, 2022

(65) Prior Publication Data
US 2024/0219216 A1    Jul. 4, 2024

(30) Foreign Application Priority Data
Mar. 22, 2021   (DE) ...................... 10 2021 107 080.5

(51) Int. Cl.
*G01F 1/69*    (2006.01)
*G01F 1/696*   (2006.01)

(52) U.S. Cl.
CPC .................... *G01F 1/696* (2013.01)

(58) Field of Classification Search
CPC ...... G01F 1/696; G01F 1/6965; G01F 1/7084; G01F 15/02; G01F 25/10; G01F 1/68;
(Continued)

(56) References Cited

U.S. PATENT DOCUMENTS

| | | | |
|---|---|---|---|
| 2007/0206654 A1* | 9/2007 | Merzliakov | G01K 17/006 374/E17.003 |
| 2009/0000396 A1 | 1/2009 | Kawanishi et al. | |

(Continued)

FOREIGN PATENT DOCUMENTS

| | | |
|---|---|---|
| DE | 102011075519 A1 | 11/2012 |
| DE | 102014115566 A1 | 5/2015 |

(Continued)

OTHER PUBLICATIONS

Bernhardsgrutter, Ralf E. et al., Robust and Flexible Thermal Sensor Using the 3-Omega-Method to Investigate Thermal Properties of Fluids, Transducers 2019—Eurosensors XXXIII, Jun. 23-27, 2019 (pp. 1909-1912).

(Continued)

*Primary Examiner* — Francis C Gray
(74) *Attorney, Agent, or Firm* — Christopher R. Powers; Endress+Hauser (USA) Holding, Inc.

(57) ABSTRACT

A method for operating a thermal sensor, wherein the thermal sensor includes a sensor element and an electronics, the sensor element in thermal contact with a container, in which a measured medium flows with a flow velocity, the sensor element periodically heated by an alternating voltage and, at the same time, a temperature of the sensor element is registered versus time, wherein the electronics determines a measured variable of the measured medium based on a comparison of the third harmonic oscillation of the alternating voltage with the third harmonic oscillation of the temperature, including calculating a phase shift between the third harmonic oscillation of the alternating voltage and the amplitude of the third harmonic oscillation of the temperature, and wherein a frequency of the alternating voltage is selected to achieve a penetration depth of an emitted heat of (Continued)

the sensor element into the measured medium at essentially zero flow velocity.

13 Claims, 3 Drawing Sheets

(58) Field of Classification Search
CPC .. G01K 3/08; G01K 7/18; G01K 7/22; G01K 13/02; G01N 25/20
See application file for complete search history.

(56) References Cited

U.S. PATENT DOCUMENTS

| | | |
|---|---|---|
| 2016/0245681 A1 | 8/2016 | Maginnis et al. |
| 2016/0290849 A1 | 10/2016 | Badarlis et al. |
| 2021/0270653 A1* | 9/2021 | Nelson .................. G01F 15/02 |
| 2023/0236052 A1* | 7/2023 | Bernhardsgrütter .. G01F 1/6986 73/204.23 |

FOREIGN PATENT DOCUMENTS

| | | |
|---|---|---|
| DE | 102015115761 A1 | 3/2017 |
| DE | 102018130548 A1 | 6/2020 |
| DE | 102020114487 A1 | 12/2021 |
| WO | 2020009921 A1 | 1/2020 |

OTHER PUBLICATIONS

Beigelbeck, Roman, et al., A novel measurement method for the thermal properties of liquids by utilizing a bridge-based micromachined sensor, Meas. Sci. Technol. 22 (2011) 105407, Aug. 26, 2011 (pp. 1-9).

* cited by examiner

THERMAL SENSOR AND METHOD FOR OPERATING THE THERMAL SENSOR

CROSS-REFERENCE TO RELATED APPLICATIONS

The present application is related to and claims the priority benefit of German Patent Application No. 10 2021 107 080.5, filed Mar. 22, 2021, and International Patent Application No. PCT/EP2022/054256, filed Feb. 21, 2022, the entire contents of which are incorporated herein by reference.

TECHNICAL FIELD

The invention relates to a method for operating a thermal sensor, wherein the thermal sensor includes at least a first sensor element and an electronics. Furthermore, the invention relates to a thermal sensor, which is embodied to be operated by means of the method of the invention.

BACKGROUND

Known for determining flow, e.g., flow velocity or flow rate, of a measured medium, e.g., a fluid, for example, a gas, gas mixture or liquid, are thermal flow sensors. These utilize the feature that a (flowing) measured medium transports heat away from a heated area. Thermal flow sensors are typically composed of a number of functional elements, usually at least a low-resistance heating element and a high-resistance resistance element, which serves as temperature sensor. Alternatively, thermal flow sensors are constructed of a plurality of low-resistance heating elements serving as heaters and temperature sensors.

Calorimetric, thermal flow sensors determine flow, e.g., flow rate, of a fluid in a channel using a temperature difference between two temperature sensors arranged downstream and upstream of a heating element. Utilized for this is the feature that the temperature difference is to a certain point linearly related to the flow, e.g., flow rate. This method is extensively described in the relevant literature.

Anemometric thermal flow sensors are composed of at least one heating element, which is heated during the flow measurement. As a result of flow of the measured medium around the heating element, a heat transport into the measured medium takes place, which changes with flow velocity. By measuring the electrical variables of the heating element, flow velocity of the measured medium can be deduced.

Such an anemometric, thermal flow sensor is typically operated in one of the following two types of control:

In the case of "Constant-Current Anemometry" (CCA) control, the heating element is supplied with a constant electrical current. Flow of the measured medium changes the resistance of the heating element and therewith the measurement signal voltage falling across the heating element. Analogously, in the case of "Constant-Voltage Anemometry" (CVA) control, the heating element is supplied with a constant voltage.

In the case of "Constant-Temperature Anemometry" (CTA) control, the heating element is kept, on average, at a constant temperature. By means of this type of control, relatively high flow velocities can be measured. Depending on flow velocity, more or less heat is extracted by the flowing measured medium, and, correspondingly, more or less electrical power needs to be supplied to keep the temperature constant. This supplied electrical power is a measure for the flow velocity of the measured medium.

The extracted heat in the case of anemometric or calorimetric thermal flow sensors is, however, dependent on thermal parameters of the measured medium—first and foremost, these are the thermal conductivity and the heat capacity of the measured medium. As a result, the thermal flow sensor needs to be calibrated in advance in a special calibration system for a specific measured medium. If the measured medium changes, the thermal flow sensor then needs to be calibrated anew in the calibration system before it can again output correct values.

There already exist measuring principal approaches for membrane flow sensors for gas, which in a first step measure thermal conductivity and heat capacity (by means of constant power or alternating electrical current) and in a second step utilize this information in the measuring of flow velocity for compensating the fluid dependence. Often, however, certain information concerning properties of the gas are a priori required in order that such self-calibration can function.

Furthermore, the thermal conductivity and the heat capacity of the measured medium often need to be measured in isolation. This separate determination frequently also requires different measuring states (for example, that the measured medium is still, thus, has a flow velocity of zero), or measurement sequences, this in turn making the execution complex, which means that a plurality of steps, different sensors and electronic components can be required. Such complex execution can often increase production costs and, thus, also lead to increased prices.

A method is described in DE 10 2018 130 548 A1, in the case of which a thermal flow sensor registers the thermal parameters of a measured medium by means of a 3-omega method. The flow velocity of the fluid registered by the thermal flow sensor is then adjusted specifically for the measured medium based on the thermal parameters.

The not yet published patent application DE102020114487.3 describes a method, in which the flow velocity of a measured medium registered by a thermal flow sensor is compensated based on a mathematical physical model. For this, measurement data specific for the measured medium are obtained in advance.

In the case of both methods, the determining of the data relevant for the compensation occurs at a measured medium flow velocity of zero. If the measured medium changes, then the ongoing operation always has to be interrupted for a renewed data collection. An operation of the flow sensor on a changing measured medium can in given cases result in imprecise flow values.

SUMMARY

Starting from the above state-of-the-art, an object of the invention is to provide a method enabling registering measured values with reference to properties of a measured medium during ongoing measurement operation.

The object is achieved by a method for operating a thermal sensor, wherein the thermal sensor includes at least a first sensor element and an electronics,
  wherein the first sensor element is placed in thermal contact with a container, especially a pipeline,
  wherein a measured medium flows through the container with a flow velocity,
  wherein the first sensor element is periodically heated by means of an alternating voltage provided in the sensor element and, at the same time, temperature of the first sensor element is registered versus time, wherein a measured variable of the measured medium is determined based on a comparison of the third harmonic oscillation of the alternating voltage provided in the first sensor element with the third harmonic oscillation of temperature of the first sensor element, especially by calculating a phase shift between the third harmonic oscillation of the alternating voltage and the amplitude of the third harmonic oscillation of temperature, and wherein a frequency of the alternating voltage is selected in such a manner that a penetration depth of an emitted heat of the first sensor element into the flow profile of the measured medium is present, in which flow velocity of the measured medium is essentially zero.

In the method of the invention, thus, a 3-omega measuring method is applied to determine the measured variable of the measured medium. The measured variable is composed of an amplitude and/or phase difference of the alternating voltage provided in the sensor element and the trailing temperature of the sensor element (in each case, based on the third harmonic oscillation) and depends on the thermal properties of the specific measured medium. An essential point of the method is that the penetration depth of the temperature emitted from the sensor element as a result of the provided alternating voltage can be influenced by the frequency of the alternating voltage. The frequency, in such case, is selected in such a manner that the penetration depth, indeed, does reach into the measured medium, but where the flow velocity of the measured medium amounts essentially to zero. Such is the case especially in the vicinity of the wall of the container. In this region, the influences of the properties of the measured medium dominate the registered measured variable compared with the influence of the flow velocity. In this way, the measured variable can also be registered during ongoing operation, thus, in the presence of a flow velocity in the container of greater than zero.

The penetration depth depends on the selected frequency:

$$PD \sim \sqrt{\frac{1}{f}}$$

wherein PD stands, in such case, for the penetration depth, while f is frequency.

In an advantageous, further development of the method of the invention, it is provided that the frequency is calculated and selected according to the formula:

$$f = \frac{\alpha}{4\pi\left[R\left(1 - \sqrt{1 - \frac{\gamma}{2}}\right)^2\right]},$$

wherein f is frequency, α a measure of the thermal diffusivity of the first measured medium, R a half-channel width of the container where the first sensor element is in thermal contact with the container, and γ a dimensionless variable with reference to the flow velocity and lies in a range between 0 and 0.2.

Application of the formula leads to a frequency range in which the desired penetration depth into the container is achieved. For the diffusivity α, knowledge of which aggregate state (liquid or gaseous) the measured medium is in suffices because the diffusivity of different aggregate states is very different independently of medium. The more exact the information concerning the measured medium, the more exactly the frequency range can be selected. If it is known, for example, that a water/alcohol mixture is present, the concentrations of the individual components are unimportant for determining the optimum frequency because the diffusivity differs only slightly with the relative concentrations. Furthermore, a frequency range is very advantageous because the thermal sensor should function for a variety of different measured media, whose properties are a priori unknown.

The frequency, or frequency range, can be determined independently of the exact embodiment of the thermal sensor (in insofar as construction, geometry, utilized materials, etc. are concerned) and is essentially predetermined as a function of the channel width of the container.

With application of this basic plan, three application variants can be implemented, alternatively or supplementally:

In a first variant of the method of the invention, it is provided that the thermal sensor is operated as a thermal flow sensor, further comprising:
  calculating a correction variable, wherein the correction variable compensates deviations of the measured variable of the measured medium relative to a reference measured variable of a reference measured medium; and
  registering a flow velocity of the measured medium and creating measured values of flow velocity compensated by means of the correction variable.

The thermal flow sensor can be operated according to at least one of the types of control described in the introductory part of the description.

The term "flow velocity" includes likewise volume flow, e.g., volume flow rate, of a measured medium.

In an advantageous embodiment of the first variant of the method of the invention, it is provided that a mathematical model of the thermal sensor is used for computing the correction variable, wherein the mathematical model describes a dependence of a produced measured value of a registered flow velocity on a measured variable of a given measured medium. The measured variable is, thus, a direct measure for the compensation, or for the expected deviation of the measured flow velocity relative to the actually present flow velocity.

In an advantageous, further development of the first variant of the method of the invention, it is provided that the thermal sensor includes another sensor element, wherein the other sensor element periodically heats the measured medium by means of the alternating voltage for the step of determining the measured variable and wherein the first sensor element is used for registering flow velocity of the measured medium. It is possible in this way to react instantaneously to a change of the measured medium, e.g., to a change of composition of the measured medium, and to compensate the measured values of flow velocity directly relative to the change because flow velocity and the measured variable of the measured medium are registered at the same time.

In a second variant of the method of the invention, it is provided that when the measured medium is present as a binary mixture of two known ingredients, the measured variable is used to calculate the concentrations of the ingredients in the measured medium. "Known" means in this connection that a reference measured variable is present for the two ingredients (in the sense of the measured value of the measured medium obtained by means of the 3-omega method). The measured variable of the measured medium is located then between the two reference measured variables. The concentrations, or the proportions, of the ingredients in the measured medium can then be calculated from the "separations" of the measured variable from the respective limits, i.e., the reference measured variables.

In an advantageous, further development of the first variant and the second variant of the method of the invention, it is provided that the step of determining the measured variable including the calculating of the correction variable and the step of registering flow velocity or the step of calculating the concentrations are performed at the same time. In such case, the other sensor element determines the measured variable, while the (first) sensor element determines flow velocity. The electronics can then calculate contemporaneously using the measured variable of the concentrations as well as the correction variable.

In a third variant of the method of the invention, it is provided that the thermal sensor is used as detection sensor, wherein the electronics redetermines the measured variable at regular intervals and compares such with a comparison measured variable of a known measured medium, and wherein the electronics creates and outputs a signal, when the measured variable differs from the comparison variable by more than a predetermined factor. In such case, the measured variable of a known measured medium is determined in advance, or at a point in time to the starting value for measured medium located in the container is determined. If the composition of the measured medium, or the measured medium itself, changes, then the current measured variable of the measured medium changes.

In an advantageous, further development of the first variant and/or the second variant of the method of the invention, it is provided that the step of determining the measured variable of the measured medium, including the calculating of the correction variable, is periodically repeated and alternated with the step of registering flow velocity or the step of calculating the concentrations, wherein the currently calculated correction variable is used for creating the compensated measured values. In this way, such an alternating mode can be used, even with only one measured medium, regularly to determine the current measured variable of the measured medium.

Furthermore, the object is achieved by a thermal sensor, which is embodied to be operated by means of the method of the invention. The thermal sensor can be embodied in various ways with respect to production method (MEMS, analog components, etc.), the materials of the components, the dimensions, etc.

Advantageously, the thermal sensor is very sensitive and has a quick response time, for example, based on embodiment as a MEMS sensor.

BRIEF DESCRIPTION OF THE DRAWINGS

The invention will now be explained in greater detail based on the drawings, the figures of which show as follows.

DETAILED DESCRIPTION

Figure 1:
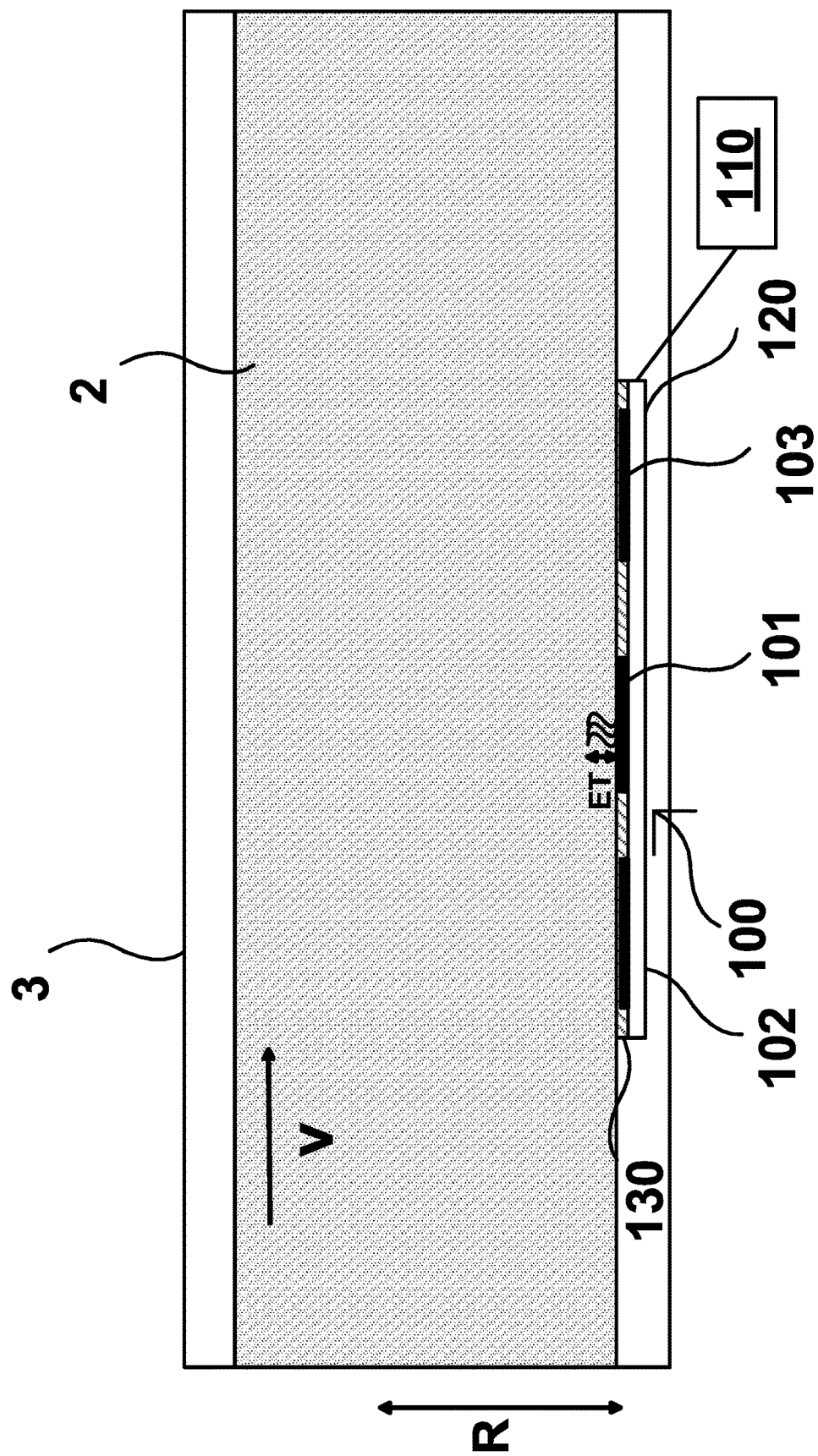
FIG. 1 shows a schematic view of an example of an application of a thermal sensor in connection with the method of the present disclosure.

FIG. 1 shows an example of an application of the method of the invention. A thermal sensor 100 is mounted in the wall of a container 3, for example, by means of a soldering or adhesive bonding method. The container 3 is a pipeline, through which a fluid (gaseous or liquid) measured medium 2 is flowing in the flow direction v. The pipeline has a circularly shaped cross-section.

The method of the invention can be applied for many variants of such an application. For instance, the thermal sensor 100 can be used in the interior of the container 3 (for example, introduced in a thermowell) or mounted on the exterior of the container 3, for example, by means of a soldering method. The cross-section of the container 3 can, alternatively, have any shape, for example, it can be square.

Thermal sensor 100 includes a substrate 120. Mounted on the substrate 120 by thick film or thin film technology are one or more sensor elements 101. Such are composed especially of platinum or a similar material having a defined temperature dependent resistance value (NTC or PTC).

In the present case, the thermal sensor 100 is embodied as a thermal flow sensor. In such a case, sensor element 101 serves for timewise alternating heating of the measured medium 2 and for determining temperature of the measured medium 2.

Two or more sensor elements 101, 102, 103 can be provided, arranged especially in the flow direction v, wherein one of the sensor elements, 101, is embodied as heating element and centrally arranged and wherein the sensor elements 102, 103 are embodied as temperature sensors and are arranged in the flow direction v upstream and downstream from the heating element.

Such a thermal flow sensor 100 is operable in the conventional, known operating modes, "calorimetric flow measurement", "anemometric flow measurement" and "time-of-flight flow measurement", and includes besides the sensor elements an electronics 110, which includes a control unit, an evaluation unit and a voltage/electrical current source, as well as wiring between the sensor elements and the electronics 110.

Calorimetric thermal flow sensors 100 determine the flow, e.g., flow rate, of the measured medium 2 in a channel via a temperature difference between two sensor elements 102, 103 in the form of temperature sensors arranged downstream and upstream from a sensor element 101 embodied as heating element. Utilized for this is that the temperature difference is to a certain point linearly related to flow, e.g., flow rate. This method is described extensively in the relevant literature.

Anemometric thermal flow sensors 100 are composed of at least one sensor element 101 in the form of a heating element, which is heated during the measuring of the flow. Flow of measured medium 2 on the heating element leads to a heat transport into the measured medium. This heat transport changes with flow velocity. By measuring the electrical variables of the heating element, flow velocity of the measured medium can be deduced.

Flow sensors working according to the so-called "time-of-flight" measuring principle have at least one sensor element 101 in the form of a heating element and a sensor element 102, 103 in the form of a temperature sensor. The heating element is used to input a momentary heat pulse into the measured medium 2, which causes a local warming of the measured medium 2.

The flowing measured medium 2 causes a movement of the local warming as a function of the flow. When the local warming reaches the vicinity of the temperature sensor, it is registered by the temperature sensor. An evaluation unit determines the time difference between the input of the heat pulse and the detecting of the local warming by the temperature sensor. The time difference is a measure of the flow velocity of the measured medium. The smaller the time difference, the greater is the flow velocity of the measured medium 2, and vice versa.

Instead of the embodiment of a sensor element 101, 102, 103 as a heating element, such can also be a cooling element, for example, a Peltier element. The above-described operating modes are likewise performable using a cooling element. For instance, a cooling pulse is input into the measured medium.

Applied on the substrate and the one or more sensor elements 101, 102, 103 is a passivation layer 130, for example, of glass. The material and strength of the substrate depend on the type of securement of the thermal sensor 100 to the container 3.

In the case, in which the thermal sensor 100 is to be placed on the exterior of the container, the passivation layer 130 can be embodied to be solderable. Thermal sensor 100 can, thus, be soldered by passivation layer 130 with the sensor elements 101, 102, 103 to the exterior of the container 3, whereby the thermal conductivity in the direction of the medium is increased. The substrate should, in such case, have a high thermal resistance, for example, be composed of a ceramic material. In this way, the heat emitted from the sensor elements 101, 102, 103 is led in the direction of the measured medium 2.

In the case, in which the thermal sensor 100 is connected the other way around, thus, connected by substrate 120 with the exterior of the container, the substrate 120 is embodied in such a manner that it has a small thermal resistance. For this, the substrate 120 is, for example, thin and composed of a metal material.

The job of the thermal sensor 100 is, on the one hand, to ascertain flow velocity of the measured medium 2, and, on the other hand, also to ascertain the composition of the measured medium 2. In the present example, the measured medium is composed of two ingredients, water and urea.

Figure 2:
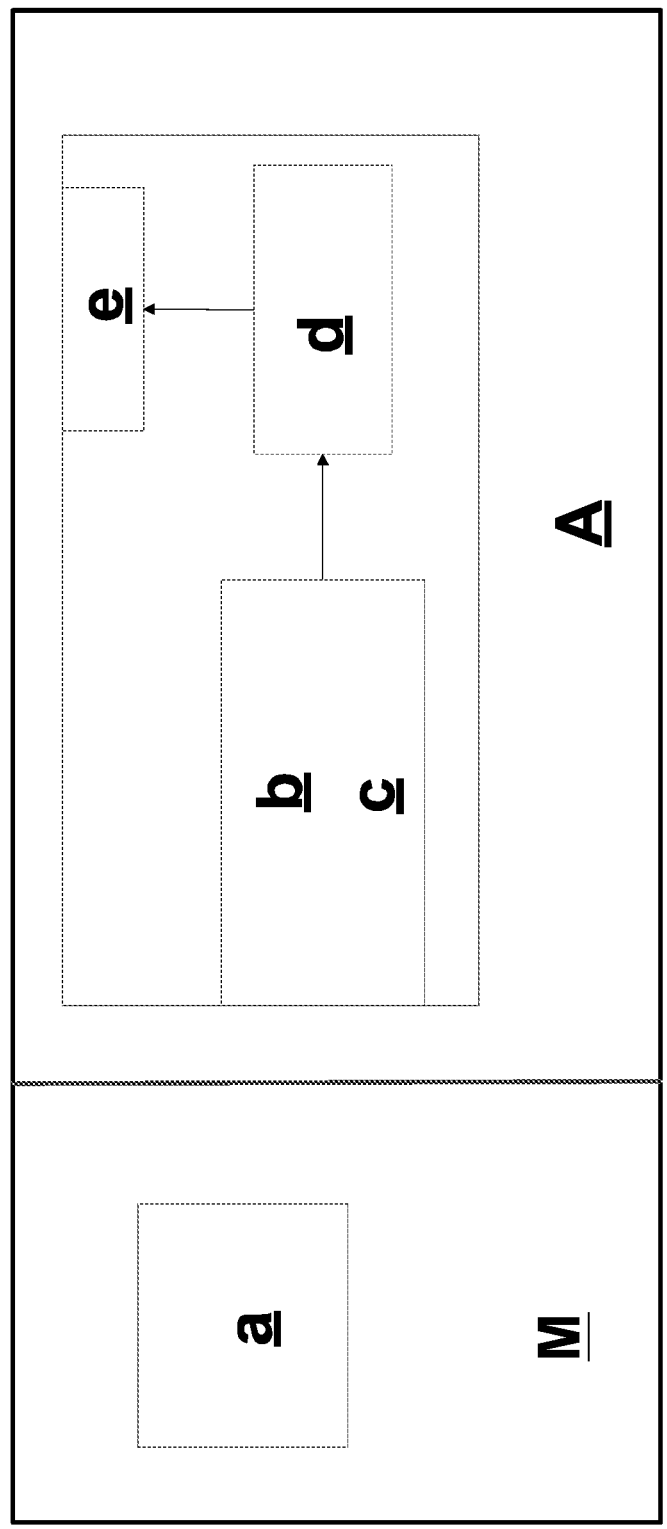
FIG. 2 shows a flowchart of the method of the present disclosure.

FIG. 2 shows a flowchart of the method of the invention. During manufacturing M, a base calibration of the thermal sensor 100 occurs in a method step a. For this, the thermal sensor 100 is installed in a calibration system, which is flowed through by two reference fluids—the first reference fluid is water, while the second reference fluid is urea or a urea-water mixture (for example, AdBlue; 32% urea, 68% water). It can be provided, in such case, that the thermal sensor 100 is connected permanently with the container 3, which with the sensor is, thus, delivered (for example, as a sounding tube with connections) and correspondingly applied into the calibration plant and in the later application at a customer's location. In a first substep, water flows through the calibration system. For this, different values of flow velocity of the water are set and a measured value of the thermal sensor 100 for each flow velocity registered by means of the electronics 110 of the thermal sensor 100. In this way, a base calibration of the flow measurement is created, thus, a dependence of the measured value on the actually present flow.

In a second substep, first water is introduced into the calibration system, then water plus urea. For the two reference media, then specific medium dependent measured variables $V_{3\omega}$ are registered by means of a 3-omega method by means of the electronics. For this, the sensor element 101 is supplied by the electronics 100 with an alternating voltage. The frequency of the alternating voltage should, in such case, be so selected that the penetration depth of the heat emitted from the sensor element 101 lies in a region, in which flow velocity of the measured medium 2 is essentially zero. Such is especially the case in the vicinity of the inner wall of the container 3. In this region, the influences of the properties of the measured medium dominate the registered measured variable compared with the influence of flow velocity.

The measured variable $V_{3\omega}$ is especially a phase shift between the third harmonic oscillation of the alternating voltage and the amplitude of the third harmonic oscillation of temperature and/or the maximum amplitude of the third harmonic oscillation of temperature.

The exact value of the frequency, or the frequency range, at which above-described phenomenon occurs, can be calculated independently of the exact construction of the thermal sensor 101 by means of the following formula:

$$f = \frac{\alpha}{4\pi\left[R\left(1 - \sqrt{1 - \frac{\gamma}{2}}\right)^2\right]}$$

In such case, f is the sought frequency, $\alpha$ a measure of the thermal diffusivity of the first measured medium, R a half-channel width of the container at the location, where the first sensor element is in thermal contact with the container, and $\gamma$ a dimensionless variable with reference to the flow velocity and lying in a range between 0 and 0.2. The half-channel width must be known for the particular container.

In the case, in which the thermal sensor 100 is mounted on the exterior of the container, the tube wall can influence the diffusivity $\alpha$ and must be taken into consideration for the correct application of the formula. Where the wall does influence the diffusivity, an effective diffusivity is used, which depends on the first measured medium and the thermal sensor 100, and their mounting on the container 3.

The base calibration for flow velocity and the measured variables $V_{3\omega}$ of the two reference media are stored in the electronics 110.

At the site of the application A, the thermal sensor is installed corresponding to the application. Then, in a method step b, the characterizing of the measured medium 2 currently flowing through the container 3 occurs. The measured medium 2 is a water-urea mixture. Simultaneously or next, a measured value of the current flow velocity of the measured medium 2 is registered in a method step c.

For method step b, a 3-omega measurement as above described is performed and the measured variable $V_{3\omega}$ of the current measured medium is registered.

In a method step d, a calculating of the current concentration of the measured medium 2 occurs, thus, the fractions of the components, water and urea, in the measured medium, along with a compensation of flow velocity by the electronics 110.

For the calculating of the concentrations, the two measured variables $V_{3\omega}$ of the reference measured media are brought into play. The measured variable $V_{3\omega}$ of the current measured medium 2 is located between the two reference measured values. The concentrations, or the fractions, of the ingredients in the measured medium 2 can then be calculated from the "separation" of the current measured variable $V_{3\omega}$ from the limits provided by the reference measured variables $V_{3\omega}$.

Figure 3:
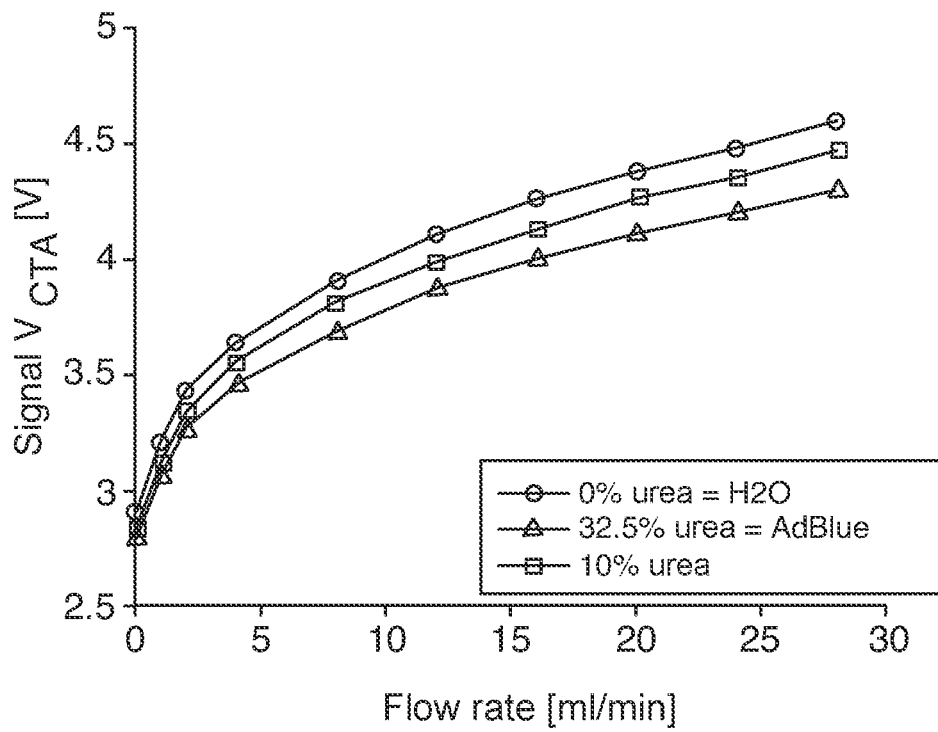
FIG. 3 shows a graph showing uncompensated measured values for flow velocities of different measured media.

The compensating of the measured value of flow velocity is performed based on the current measured variable $V_{3\omega}$ and the base calibration. FIG. 3 shows measurement curves of uncompensated measured values of flow velocity for different concentrations of the measured medium 2. Plotted on the x-axis is flow velocity of the measured medium 2. Plotted on the y-axis is the measured value of the thermal sensor 100 for the particular flow velocity. For the curve with the circular points, a measured medium containing the fractions, 100% water and 0% urea, was used. For the curve with the square points, a measured medium containing the fractions, 90% water and 10% urea, was used. For the curve with the triangular points, a measured medium containing the fractions, 67.5% water and 32.5% urea, was used. It is clear that the type of measured medium 2 (thus the ingredients present in the measured medium and their fractions) greatly affects the measured values registered by the thermal sensor. For this reason, the measured values do need to be compensated. For this, a correction variable is calculated, wherein the correction variable compensates deviations of the measured variable of the measured medium from a reference measured variable of a reference measured medium.

For this, a mathematical model of the thermal sensor is used for computing the correction variable, wherein the mathematical model describes a dependence of a produced measured value of a registered flow velocity on a measured variable $V_{3\omega}$ of some measured medium 2. The measured variable $V_{3\omega}$ is, thus, a direct measure for the compensation, or for the expected deviation of the measured flow velocity from the actually present flow velocity.

Figure 4:
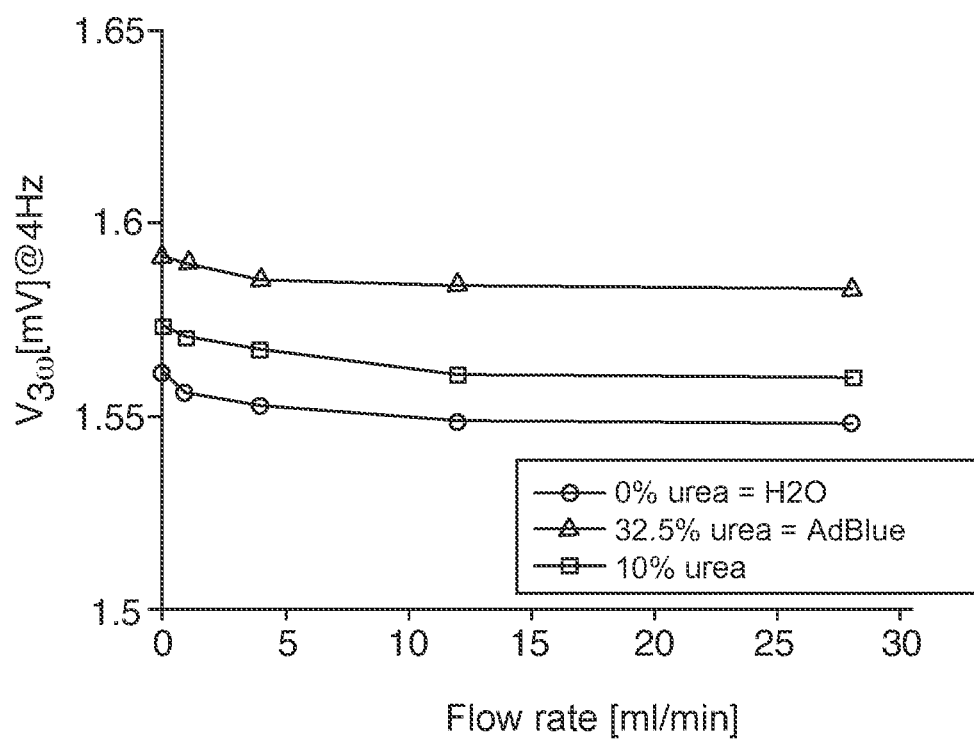
FIG. 4 shows a graph showing measured variables of the 3-omega method for various measured media at different flow velocities.

The measured variable $V_{3\omega}$ of the measured medium 2 is, in such case, only dependent on the measured medium 2, however, not, such as above described, due to the selected frequency of the 3-omega measuring, on the current flow velocity of the measured medium 2. FIG. 4 shows the dependence of the measured variables $V_{3\omega}$ (y-axis)—in such case, the maximum amplitude—of the measured media of FIG. 3 on flow velocity (x-axis). It is evident that the measured variables $V_{3\omega}$ are, because of above-described selection of the frequency, essentially independent of flow velocity and differ greatly relative to one another.

In a last method step e, the concentrations and the current compensated measured value of flow velocity are output. It can be provided that method steps b to e are repeated in regular intervals. In the case of application of a single sensor element 101, the steps of determining flow velocity and registering the measured variable $V_{3\omega}$ can be executed alternately. In the case of application of at least one additional sensor element 102, 103, these steps can be executed at the same time, wherein one of the sensor elements performs the step of determining flow velocity and the other sensor element performs the step of registering the measured variable $V_{3\omega}$.

Additionally or alternatively, the thermal sensor can be embodied as a detection sensor. This registers the measured variable $V_{3\omega}$ of the measured medium 2 in regular intervals and compares such with a reference measured variable. In the case, in which the current measured variable $V_{3\omega}$ differs by a predetermined factor from the reference measured variable, the electronics 110 outputs an alarm.

LIST OF REFERENCE CHARACTERS

100 thermal sensor
101, 102, 103 sensor elements
110 electronics
120 substrate
130 passivation layer
2 measured medium
3 container
PD penetration depth
R half opening width
a, b, . . . , e method steps
v flow velocity
$V_{3\omega}$ measured variable of the measured medium

The invention claimed is:

1. A method for operating a thermal sensor, wherein the thermal sensor comprises at least a first sensor element and an electronics, wherein the first sensor element is in thermal contact with a container, through which a measured medium flows at a flow velocity, the method comprising:
   periodically heating the first sensor element by applying an alternating voltage to the first sensor element while simultaneously detecting a temperature of the first sensor element over time; and
   determining a measured variable of the measured medium based on a comparison of a third harmonic oscillation of the alternating voltage applied to the first sensor element with a third harmonic oscillation of the temperature of the first sensor element using the electronics, wherein the comparison includes calculating a phase shift between the third harmonic oscillation of the alternating voltage and an amplitude of the third harmonic oscillation of the temperature,
   wherein a frequency of the alternating voltage is selected such that an emitted heat of the first sensor element extends into the measured medium to a penetration depth when the flow velocity of the measured medium is essentially zero.

2. The method of claim 1, wherein the frequency is calculated and selected according to the formula:

$$f = \frac{\alpha}{4\pi \left[ R \left( 1 - \sqrt{1 - \frac{\gamma}{2}} \right)^2 \right]},$$

wherein f is the frequency, $\alpha$ is a measure of the thermal diffusivity of the measured medium, R is a half-channel width of the container, and $\gamma$ is a dimensionless variable related to the flow velocity and is in a range between 0.0 and 0.2.

3. The method of claim 1, wherein the thermal sensor is operated as a thermal flow sensor, the method further comprising:
   calculating a correction variable, wherein the correction variable compensates for deviations of the measured variable of the measured medium relative to a reference measured variable of a reference measured medium;
   detecting the flow velocity of the measured medium; and
   generating measured values of the flow velocity compensated by the correction variable.

4. The method of claim 3, wherein a mathematical model of the thermal sensor is used for computing the correction variable, wherein the mathematical model describes a dependence of a generated measured value of a detected flow velocity on a measured variable of any measured medium.

5. The method of claim 4, wherein the thermal sensor includes a second sensor element, wherein the second sensor element is used to periodically heat the measured medium by applying the alternating voltage thereto for determining the measured variable of the measured medium, and wherein the first sensor element is used for detecting the flow velocity of the measured medium.

6. The method of claim 1, wherein the measured medium is a binary mixture of two known ingredients, the method further comprising calculating concentrations of the ingredients in the measured medium using the measured variable.

7. The method of claim 6, wherein the determining the measured variable of the measured medium, including the calculating of the correction variable, and the detecting of the flow velocity or the calculating the concentrations are performed at the same time.

8. The method of claim 1, wherein the thermal sensor is used as detection sensor, the method further comprising:

using the electronics to:

redetermine the measured variable at regular intervals;

compare the redetermined measured variable with a comparison measured variable of a known measured medium; and generate and output a signal when the redetermined measured variable differs from the comparison measured variable by more than a predetermined factor.

9. The method of claim 8, wherein the determining the measured variable of the measured medium, including the calculating of the correction variable, is periodically repeated and alternated with detecting the flow velocity or the calculating the concentrations, wherein the currently calculated correction variable is used for creating the compensated measured values.

10. The method of claim 6, wherein the determining the measured variable of the measured medium, including the calculating of the correction variable, is periodically repeated and alternated with detecting the flow velocity or the calculating the concentrations, wherein the currently calculated correction variable is used for creating the compensated measured values.

11. The method of claim 3, wherein the determining the measured variable of the measured medium, including the calculating of the correction variable, is periodically repeated and alternated with detecting the flow velocity or the calculating the concentrations, wherein the currently calculated correction variable is used for creating the compensated measured values.

12. The method of claim 1, wherein the container is a pipeline.

13. A thermal sensor embodied and configured to perform the method of claim 1.

* * * * *